(12) United States Patent
Hogle (10) Patent No.: US 7,667,704 B2
(45) Date of Patent: Feb. 23, 2010

(54) SYSTEM FOR EFFICIENT REMOTE PROJECTION OF RICH INTERACTIVE USER INTERFACES

(75) Inventor: Francis Hogle, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 463 days.

(21) Appl. No.: 11/095,255

(22) Filed: Mar. 30, 2005

(65) Prior Publication Data

US 2006/0227141 A1 Oct. 12, 2006

(51) Int. Cl.
G06T 13/00 (2006.01)
(52) U.S. Cl. .............. 345/473; 345/589; 345/156; 345/169; 725/112; 709/227
(58) Field of Classification Search .......... 345/419, 345/473, 589, 156, 169, 173; 709/227
See application file for complete search history.

(56) References Cited

U.S. PATENT DOCUMENTS

| | | | |
|---|---|---|---|
| 5,809,497 | A | 9/1998 | Freund et al. |
| 6,084,582 | A | 7/2000 | Qureshi et al. |
| 6,342,907 | B1 | 1/2002 | Petty et al. |
| 6,366,914 | B1 | 4/2002 | Stern |
| 6,452,609 | B1 | 9/2002 | Katinsky et al. |
| 6,460,058 | B2 | 10/2002 | Koppolu et al. |
| 6,731,312 | B2 | 5/2004 | Robbin |
| 7,036,083 | B1 | 4/2006 | Zenith |
| 7,152,094 | B1 * | 12/2006 | Jannu et al. ............ 709/206 |
| 7,203,678 | B1 | 4/2007 | Petropoulos et al. |
| 7,246,134 | B1 | 7/2007 | Kitain et al. |
| 7,283,121 | B2 | 10/2007 | Adan et al. |
| 2002/0015042 | A1 * | 2/2002 | Robotham et al. ...... 345/581 |
| 2002/0078467 | A1 | 6/2002 | Rosin et al. |
| 2002/0085020 | A1 | 7/2002 | Carroll, Jr. |
| 2002/0105546 | A1 | 8/2002 | Kuntz |
| 2002/0130904 | A1 | 9/2002 | Becker et al. |
| 2002/0180803 | A1 | 12/2002 | Kaplan et al. |
| 2002/0196268 | A1 | 12/2002 | Wolff et al. |
| 2002/0199190 | A1 | 12/2002 | Su |
| 2003/0061279 | A1 | 3/2003 | Llewellyn et al. |
| 2003/0078972 | A1 | 4/2003 | Tapissier et al. |
| 2003/0079038 | A1 | 4/2003 | Robbin et al. |

(Continued)

FOREIGN PATENT DOCUMENTS

EP 1376331 1/2004

OTHER PUBLICATIONS

IEEE Std 802.15.1 IEEE Standard for Information technology- Telecommunications and information exchange between systems- Local and metropolitan area networks- Specific requirements Part 15.1: Wireless Medium Access Control (MAC) and Physical Layer (PHY) Specifications for Wireless Personal Area Networks (WPANs), 2002, pp. 49 and 61.*

(Continued)

*Primary Examiner*—Kimbinh T Nguyen
(74) *Attorney, Agent, or Firm*—Lee & Hayes, PLLC (57) ABSTRACT

An exemplary method of communicating between a host device and a rendering device for controlling a user interface of the rendering device includes generating messages, encoding the messages in a buffer as blobs of data and communicating the blobs of data to the rendering device. Various other exemplary methods, devices, systems, etc., are also disclosed.

16 Claims, 6 Drawing Sheets

U.S. PATENT DOCUMENTS

| | | | |
|---|---|---|---|
| 2003/0101450 | A1 | 5/2003 | Davidsson et al. |
| 2003/0167318 | A1 | 9/2003 | Robbin et al. |
| 2003/0184585 | A1 | 10/2003 | Lin et al. |
| 2003/0234804 | A1 | 12/2003 | Parker et al. |
| 2004/0002932 | A1 | 1/2004 | Horvitz et al. |
| 2004/0031058 | A1* | 2/2004 | Reisman .................... 725/112 |
| 2004/0044725 | A1 | 3/2004 | Bell et al. |
| 2004/0070628 | A1 | 4/2004 | Iten et al. |
| 2004/0130550 | A1* | 7/2004 | Blanco et al. ............... 345/473 |
| 2004/0133848 | A1 | 7/2004 | Hunt et al. |
| 2004/0141013 | A1 | 7/2004 | Alcazar et al. |
| 2004/0165006 | A1 | 8/2004 | Kirby et al. |
| 2004/0189695 | A1 | 9/2004 | Kurtz et al. |
| 2005/0010871 | A1 | 1/2005 | Ruthfield et al. |
| 2005/0066207 | A1 | 3/2005 | Fleck et al. |
| 2005/0081155 | A1 | 4/2005 | Martin et al. |
| 2005/0091107 | A1 | 4/2005 | Blum |
| 2005/0125734 | A1* | 6/2005 | Mohammed et al. ........ 715/731 |
| 2005/0132401 | A1 | 6/2005 | Boccon-Gibod et al. |
| 2005/0149872 | A1 | 7/2005 | Fong et al. |
| 2005/0262542 | A1 | 11/2005 | DeWeese et al. |
| 2006/0168340 | A1 | 7/2006 | Heller et al. |
| 2006/0224575 | A1 | 10/2006 | Ostojic |
| 2006/0225037 | A1 | 10/2006 | Glein et al. |
| 2007/0220580 | A1 | 9/2007 | Putterman et al. |
| 2008/0163078 | A1 | 7/2008 | Van Der Sanden et al. |

OTHER PUBLICATIONS

European Search Report.
"A Method of Communicating with a Backend Server From a Dialog System", IBM, Nov. 2001, pp. 3.
"Configuring Emails—Netscape", retrieved on Sep. 12, 2007, at <<http://web.archive.org/web/2002086210940/http://support.rdsindia.com/email/netscape/step1.htm>>, RDSIndia.com, pp. 2.
Kovsky, "Absolute Beginners Guide to Microsoft Windows XP Media Center", Feb. 10, 2004, Que, 8 pages.
"How use RegisterMCEApp?", retrieved on Apr. 9, 2009 at <<http://thegreenbutton.com/forums/thread/19639.aspx>>, 2 pages.
"Microsoft Windows XP Professional Service Pack 2.", (overview), published Aug. 18, 2004, Microsoft Corporation 2009, 7 pages.
Ogletree et al., "Microsoft Windows XP Unleashed"., Sams, Dec. 11, 2001.
"Registering an Application Under the Start Menu Category", retrieved on Apr. 9, 2009 at <<http://web.archive.org/web/20050221063120/http://msdn.microsoft.com/library/en-us/MedctrSDK/htm/registeringanap-plicationunderthestartmenucategory.asp>>, Feb. 21, 2005, 3 pages.
"Windows Media Center 2005 SDK", retrieved on Apr. 10, 2009 at<<http://msdn.microsoft.com/en-us/library/ms816303.aspx>>, MSDN, Aug. 13, 2004, 2 pages.
"ATI Remote Wonder", retrieved on Aug. 5, 2009 at <<http://web.archive.org/web/20030204012742/http://www.tweaknews.net/reviews/atiremote>>, TweakNews.net, Feb. 3, 2003, pp. 1-3.
"ATI's Remote Wonder", retrieved on Aug. 5, 2009 at <<http://web.archive.org/web/20021001085515/www.ati.com/shopati/promotions/remotewonder.html>>, Feb. 2, 2003, pp. 1-2.
"Showshifter Features, Digital Video Recorder", retrieved on Aug. 5, 2009 at <<http://web.archive.org/web/20030202085919/http://www.showshifter.com/features/dvr.htm>>, 2003, pp. 1-2.
"Showshifter Support, Infrared Receivers and Remotes", retrieved on Aug. 5, 2009 at <<http://web.archive.org/web/20021216062102/www.showshifter.com/support/ircompat.htm>>, 2002, pp. 1-2.
"Showshifter Support, Media Center System Requirements", retrieved on Aug. 5, 2009 at <<http://web.archive.org/web/20021210143637/www.showshifter.com/index.htm>>, Feb. 2, 2003, pp. 1-3.
Creasy, "How to Build an Add-In for Windows Media Center Edition 2005", <<http.//blogs.msdn.com/mreasy/archive/2004/10/12/241449.aspx>>, Oct. 12, 2004, 5 pgs.
Creasy, "Installing applications on Media Center", retrived at <<http://blogs.msdn.com/mcreasy/archive/2005/02/17/375600.aspx>>Feb. 17, 2005, 5 pgs.
Earls, "An Introduction to Developing Software for Microsoft Windows XP Media Center Edition 2005", Mar. 8, 2005, 7 pgs.
Earls, "Building.NET Add-Ins for Windows Media Center Edition", Jun. 5, 2005, 7 pgs.
"Microsoft Windows XP Media Center Edition 2005 - Reviewers Guide", Oct. 2004, 95 pgs.
MSDN Home, "Category Element", retrived at <<http://msdn.microsoft.com/en-us/library/aa468319.aspx>>, Aug. 13, 2004, 2 pgs.
MSDN, "Registering an Add-in Media Center", retrived at <<http://msdn.microsoft.com/en-us/library/aa468469.aspx>>, Feb. 17, 2005, 5 pgs.

* cited by examiner

SYSTEM FOR EFFICIENT REMOTE PROJECTION OF RICH INTERACTIVE USER INTERFACES

RELATED APPLICATIONS

This application is related to U.S. patent application Ser. No. 11/095,758 entitled, "Enabling UI template customization and reuse through parameterization", to Glein, Hogle, Stall, Mandryk and Finocchio, filed on Mar. 30, 2005, (which is incorporated by reference herein); U.S. patent application Ser. No. 11/095,764 entitled "System and method for dynamic creation and management of lists on a distance user interface", to Ostojic, filed on Mar. 30, 2005, (which is incorporated by reference herein); and U.S. patent application Ser. No. 11/095,746 entitled "Context menu navigational method for accessing contextual and product-wide choices via remote control", to Ostojic, Glein and Sands, filed on Mar. 30, 2005, (which is incorporated by reference herein).

TECHNICAL FIELD

Subject matter disclosed herein relates generally to communication of one or more messages for instructing a graphical user interface.

BACKGROUND

User interface systems typically face a trade-off between high interactivity via local program code and projection to, typically, remote rendering devices, where network bandwidth impedes their ability to provide high interactivity. Many systems simply accept degraded interactivity or quality when using a rendering device or "renderer". Other systems explicitly provide snippets of helper code to execute on rendering devices. Still others adopt an explicit host/renderer model for user interface, forcing developers to design two whole pieces of software that communicate with each other. Finally, some approaches simply demand higher performance rendering device hardware and connectivity to provide richness in such scenarios.

These systems have significant drawbacks. Degrading quality affects end user results. Requiring snippets of helper code complicates the programming and interaction models. Renderer/host computing forces each application developer to develop explicitly for each possible rendering device, thereby limiting the reach or prohibitively increasing the cost of many solutions. Requiring higher performance rendering device hardware and connectivity also carries prohibitive cost.

Subject matter presented herein addresses these and other issues, for example, by judicious selection of renderer and host runtime components, communications protocol design and programming model.

SUMMARY

An exemplary method of communicating between a host device and a rendering device for controlling a user interface of the rendering device includes generating messages, encoding the messages in a buffer as blobs of data and communicating the blobs of data to the rendering device. Various other exemplary methods, devices, systems, etc., are also disclosed.

BRIEF DESCRIPTION OF THE DRAWINGS

Non-limiting and non-exhaustive examples are described with reference to the following figures, wherein like reference numerals refer to like parts throughout the various views unless otherwise specified.

DETAILED DESCRIPTION

In the description that follows, various exemplary methods, devices, systems, etc., are presented.

Figure 1:
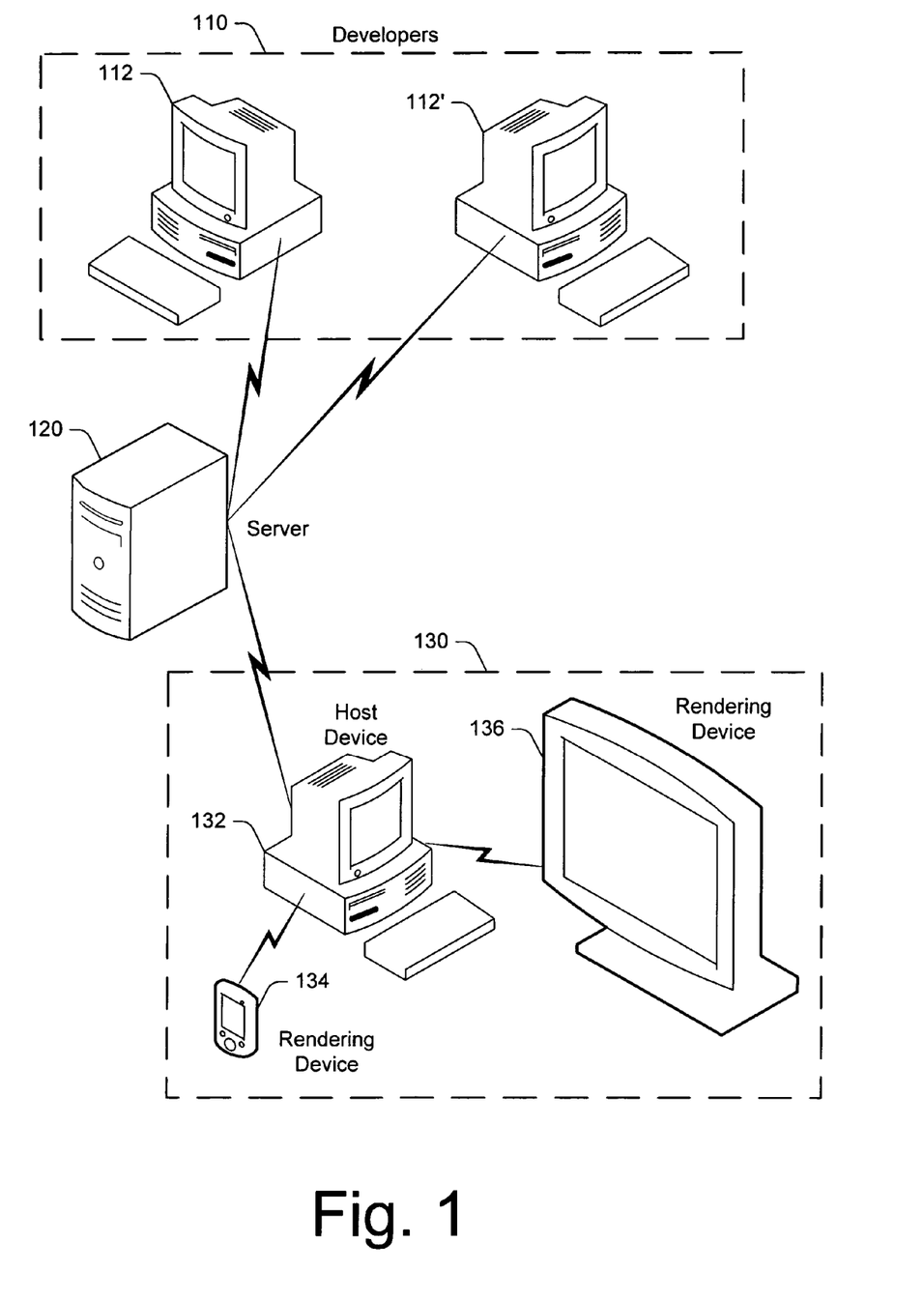
FIG. 1 is a diagram of an exemplary system that includes developers, a server, a host and one or more renderers.

FIG. 1 shows an exemplary system 100 that includes a developer environment 110, a server 120 and a client environment 130. Of course, many such client environments may be in communication with the server 120. Developers in the developer environment 110, as represented by workstations 112, 112', develop applications for distribution or use by the server 120. In turn, the server 120 allows the host 132 in the client environment 130 to download such applications, cooperate with such applications, etc.

The host 132 in the client environment 130 hosts one or more rendering devices 134, 136. As described herein various exemplary methods, devices, systems, etc., provide for efficient rendering of a user interface on a rendering device in communication with a host. Such a user interface may be directed by native applications of a host or by non-native application. Such non-native application may be controlled to some degree by a remote server. Communication between the host and the one or more rendering devices 134, 136 may be unidirectional, bi-directional or multi-directional. Particular examples, discussed herein refer to unidirectional and bi-directional but may also be implemented in multi-directional manner where more than one host exists. In some instances, rendering device to rendering device communication may occur.

In the exemplary client environment 130, the rendering device 134 represents a smaller rendering device such as a handheld device or a controller for a "smart" appliance, security system, environmental system, etc. The rendering device 136 represents a larger rendering device such as a TV, a projector, a monitor, etc., which may be used to view TV shows, movies, news broadcasts, sports, etc. Other exemplary rendering devices may be picture frame devices, set top boxes, cell phones, game boxes and the like. While a rendering device is generally not intended to serve as a substitute for a personal computer; various exemplary methods, protocols, etc., presented herein may be implemented for communication between a host and a personal computer. In such examples, the host may be a personal computer or other computer.

While some rendering devices may have memory or storage capacity in excess of a typical personal computer, the processing resources are usually dedicated to special purpose tasks. For example, a set top box may have RAM to capture HDTV frames and a high capacity hard drive to store full length movies yet have limited ability to run business applications that run on most personal computers. To construct a set top box to run such business applications would increase cost of the set top box and potentially complicate programming of dedicated audio-visual tasks.

As already mentioned, rendering devices come in all types of shapes and sizes with varying capabilities to perform many different types of tasks. To require manufactures to beef-up resources to facilitate the job of a host, is unrealistic, especially in the home market where incremental cost can be a significant factor in implementation. Instead, in such circumstances (e.g., whether home or other), the host device should generally be capable of bearing the bulk of the burden when presentation of or interaction with a user interface on a rendering device is required.

Referring again to the rendering device 136, such a device may present a user interface that works well at a distance of about ten feet and may be controlled via a remote control. A typical remote control is smaller and easier to use than a conventional keyboard and mouse; however, it generally provides a more limited form of user input (e.g., due to fewer keys or buttons). And while a greater viewing distance provides a more comfortable experience, it can necessitate features that provide a visual design style to ensure clarity, coherence, and readability. In addition, a user may expect the user interface to have display quality equivalent to that of a conventional TV or HDTV where frames are displayed smoothly, i.e., consecutive frames are displayed at a particular frame rate that provides the user or viewer with an uninterrupted, glitch-free presentation of media.

A user may also expect the rendering device like the device 136 to provide a dynamic, animated experience. A user may also expect that input will be easy and make her experience simpler, not more complicated. A user may also expect applications to be more convenient, simpler to learn, and easier to use than applications controlled by the keyboard or mouse.

Various exemplary methods, devices, systems, etc., described herein rely on asynchronous communication, which may, for example, reduce risk of interruptions, glitches, dropped frames, delayed frames, etc., by a rendering device. As explained in more detail below, an exemplary asynchronous communication protocol reduces network time and can provide a better user viewing experience when compared to synchronous communication protocols. A typical synchronous communication protocol is presented with respect to FIG. 2, followed by a typical asynchronous communication protocol, FIG. 3, and various exemplary asynchronous communication protocols (e.g., FIG. 4).

Figure 2:
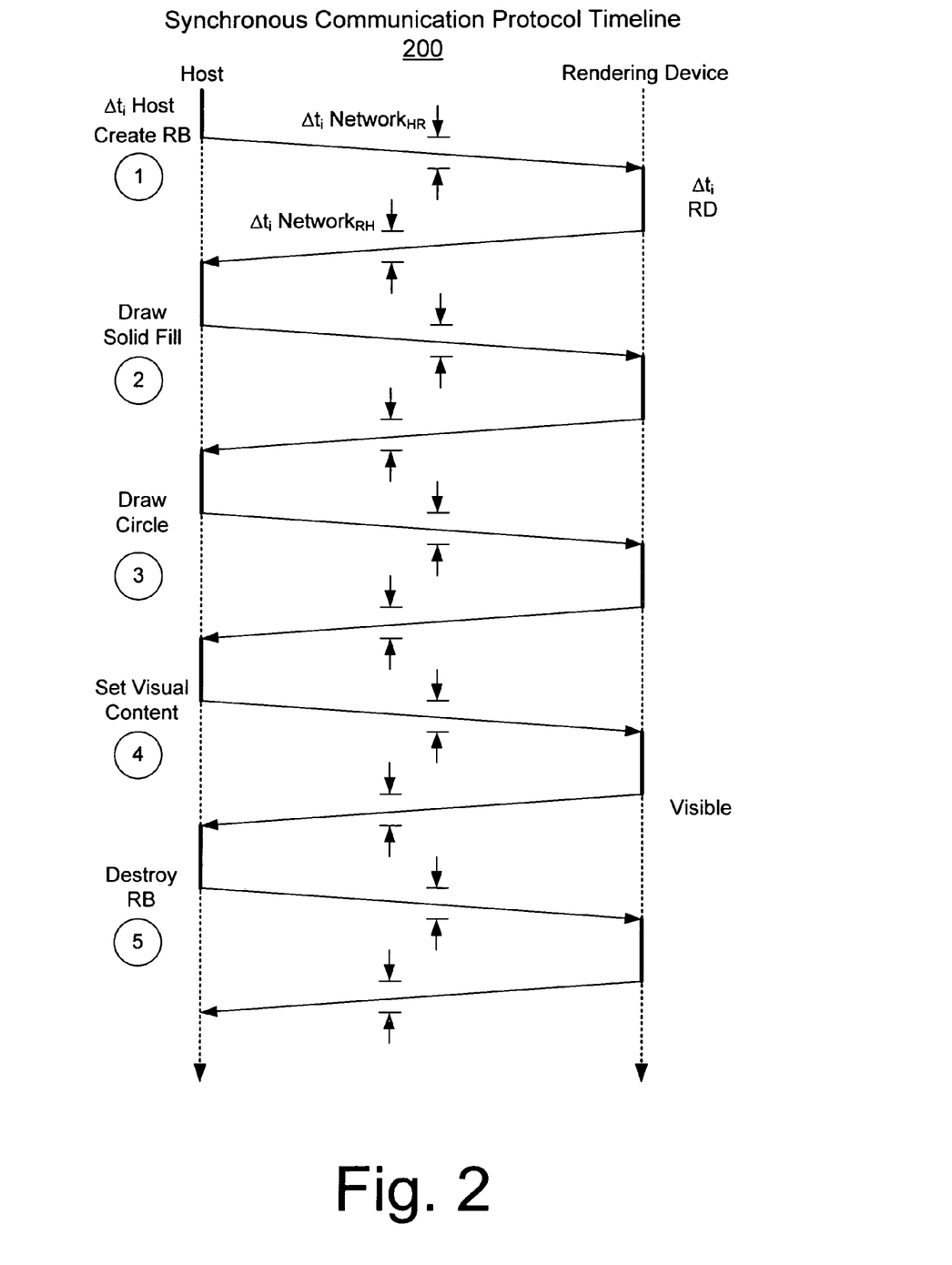
FIG. 2 is a timeline for a synchronous communication protocol for a rendering device receiving instructions for a graphical user interface from a host device.

FIG. 2 shows a typical synchronous communication protocol timeline 200 for communication between a host and a rendering device. As communications occur from rendering device to host as well, the timeline 200 exhibits bi-directional communication. In general, the host may rely on a "framework" that issues messages for a "renderer" of a rendering device. The framework typically acts as an intermediate between an application and a communication layer associated with a communication interface. The framework may be dedicated to user interface tasks or it may provide other functionality as well. The renderer is generally software that can receive instructions (e.g., from a user interface framework) and, in turn, direct hardware to cause the display of a user interface, user interface components, etc. (e.g., graphics, animations, etc.). Conventional renderers typically support one or more standards such as, but not limited to, DirectX graphics (e.g., DirectDraw, Direct3D), OpenGL graphics (Open Graphics Library), or GDI graphics (Graphical Device Interface).

Referring again to the timeline 200 of FIG. 2, the timeline 200 indicates when various events occur on the host side and on the rendering device side, where the host and rendering device communicate via a network, a wireless link, a cable, etc.

The events correspond to rendering tasks for display of a user interface by the rendering device. The tasks originating with the host include: (1) create render builder (RB); (2) draw solid fill; (3) draw circle; (4) set visual content; and (5) destroy render builder (RB).

The render builder creation task (1) and destruction task (5) basically serve as a start point and an end point, respectively, for one or more drawing or related messages (e.g., tasks (2)-(4)), which in the synchronous communication protocol timeline 200 are communicated in series of communications from the host to the rendering device.

The rendering device receives instructions or metadata for the tasks (1)-(5) and processes the instructions (e.g., using a renderer) upon receipt via the network. A delay exists between the host sending the instructions or metadata (throughout this description "or" generally means "and/or"), which is represented by $\Delta t_i$ Network$_{HR}$. The host $\Delta t_i$ Host has a delay and the rendering device has a delay $\Delta t_i$ RD. Further, where the rendering device sends information to the host, another delay occurs $\Delta t_i$ Network$_{RH}$. Thus, for the example of FIG. 2, each task has four associated delays: $\Delta t_i$ Network$_{HR}$, $\Delta t_i$ Network$_{RH}$, $\Delta t_i$ Host, and $\Delta t_i$ RD.

Host resources may be increased or optimized to diminish $\Delta t_i$ Host and network traffic may be reduced or optimized to diminish $\Delta t_i$ Network$_{HR}$ and $\Delta t_i$ Network$_{RH}$; however, as described herein, rendering device capabilities are not part of a solution to increased performance for user interfaces. Thus, $\Delta t_i$ RD is considered rendering device dependent and a limitation.

Referring again to the timeline 200, the rendering device may actually display the circle after receipt of the "set visual content" task and processing of that task by the rendering device. At the time of display, seven network delays, four host delays and four rendering device delays have occurred. Further, where network traffic is significant or other host tasks many, probability of additional delays exist. Thus, a compelling need exists to reduce the number of network communications between the host and the rendering device.

Figure 3:
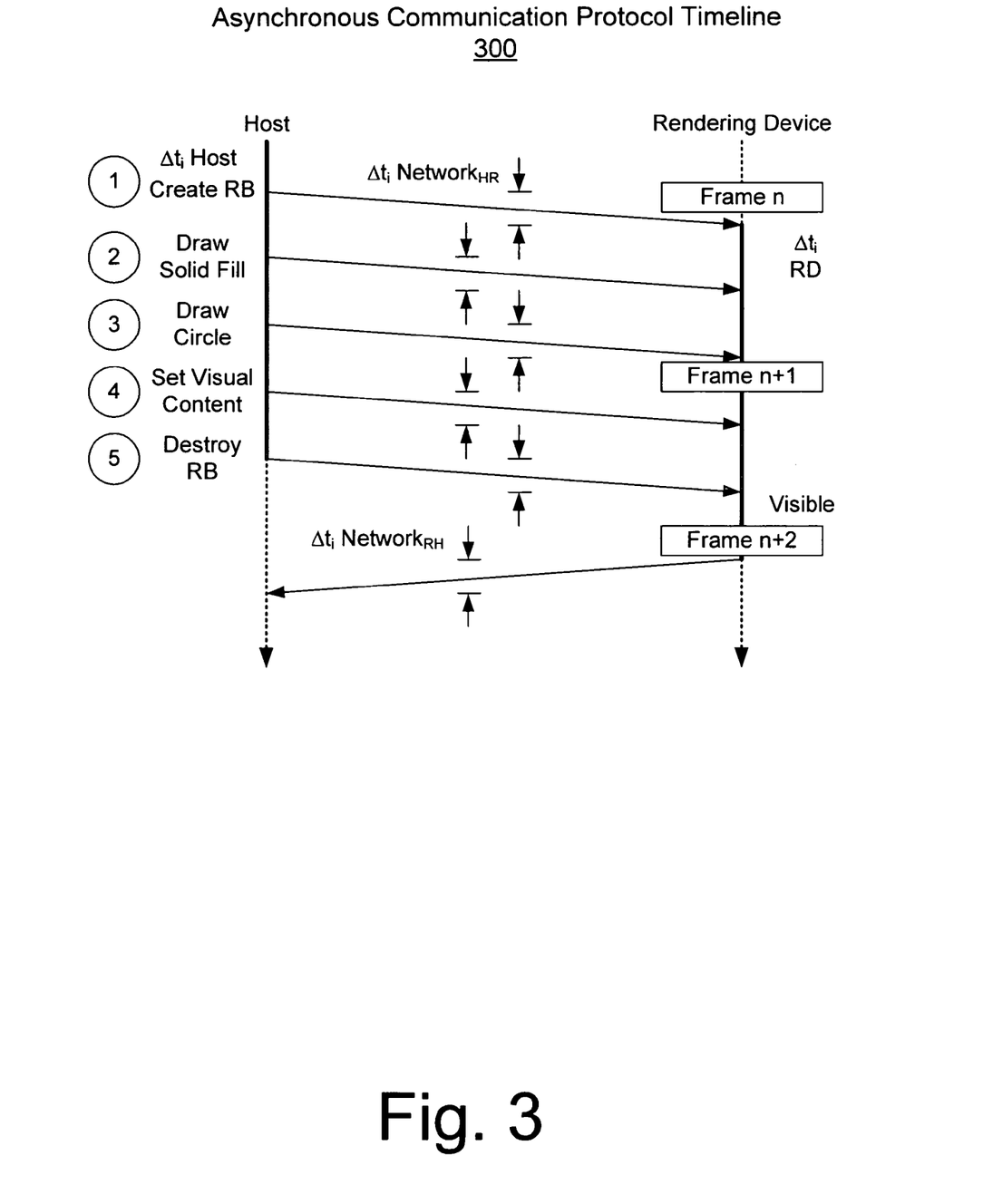
FIG. 3 is a timeline for an asynchronous communication protocol for a rendering device receiving instructions for a graphical user interface from a host device.

FIG. 3 shows a typical asynchronous communication protocol timeline 300 in relationship to the same tasks as presented in FIG. 2. However, the timeline 300 also shows frames displayed by the rendering device (e.g., Frame n, Frame n+1 and Frame n+2). These frames represent additional tasks to be performed by the rendering device that may be interrupted, shifted or not displayed due to execution of host communicated tasks. As mentioned, such conflicts can tarnish a user's experience.

The render builder creation task (1) and destruction task (5) basically serve as a start point and an end point, respectively, for one or more drawing or related messages (e.g., tasks (2)-(4)), which in the asynchronous communication protocol timeline 300 are communicated in series of communications from a host to a rendering device.

The asynchronous communication protocol represented by the timeline 300 uses fewer rendering device to host communications than the synchronous protocol represented by the timeline 200. In particular, the number is greatly reduced by the fact that the rendering device only sends one communication to the host, which occurs after execution of all host requested tasks. However, the host still sends five separate communications to the rendering device. Thus, the total number of communication is six as compared with 10 for the synchronous timeline 200.

Figure 4:
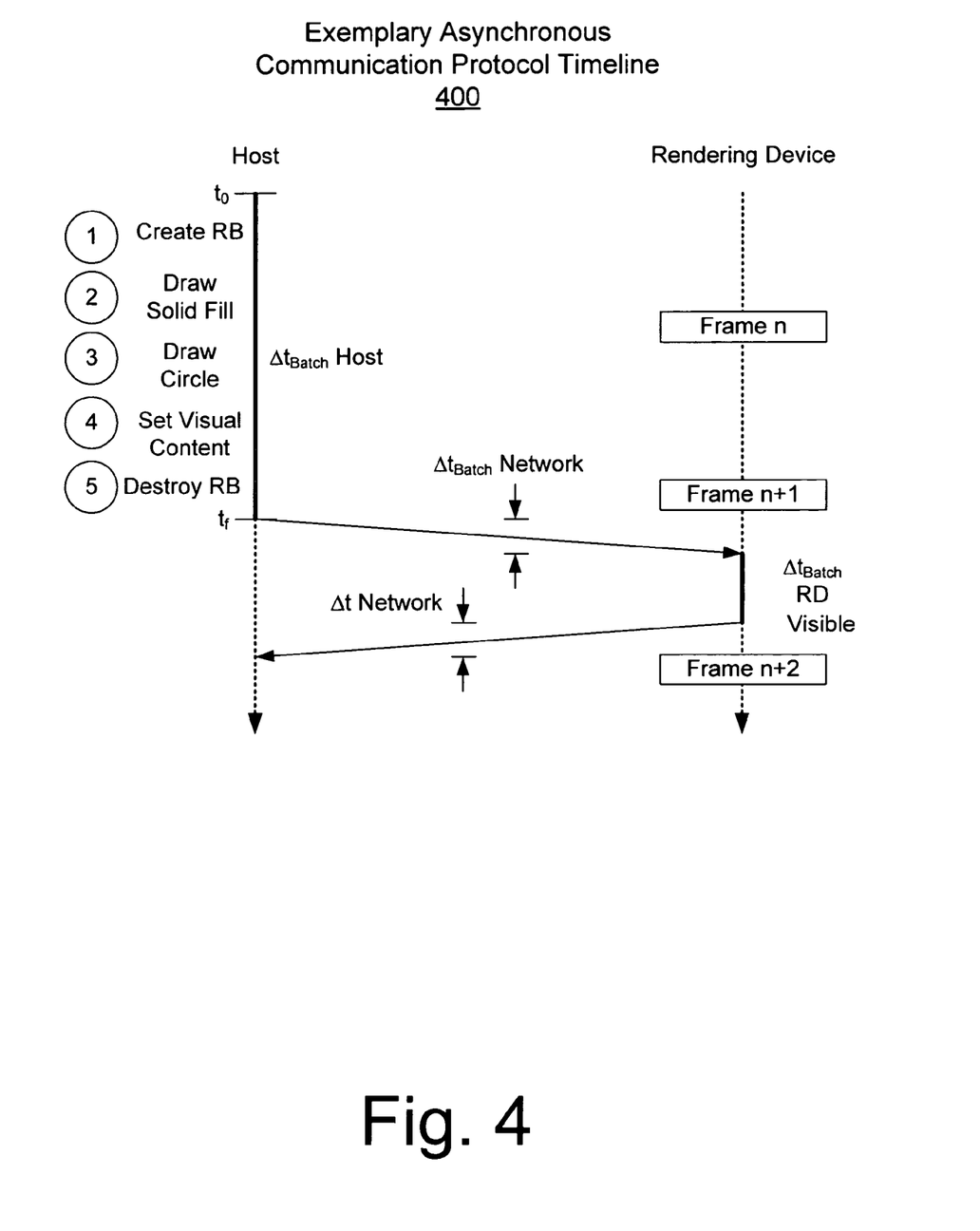
FIG. 4 is a timeline for an exemplary asynchronous communication protocol for a rendering device receiving instructions for a graphical user interface from a host device.

Having explained a typical synchronous communication protocol and a typical asynchronous communication, consider the exemplary asynchronous communication protocol presented with respect to the timeline 400, which, as shown, provides for bi-directional. In other examples, unidirectional or multi-directional communication may occur using an exemplary communication protocol, as appropriate. In the example of FIG. 4, the exemplary asynchronous communication protocol only requires one communication from the host to the rendering device and one communication from the rendering device to the host, which may be optional. Thus, the render builder creation task (1) and destruction task (5) basically serve as messages that hold, therebetween, one or more drawing or related messages (e.g., tasks (2)-(4)). In contrast to the protocols of the timeline 200 and the timeline 300, the creation task (1) and the destruction task (5) are, in the asynchronous communication protocol timeline 400, communicated in a single communication from the host to the rendering device, along with tasks (2)-(4). Of course, other arrangements are possible.

As described herein, an exemplary asynchronous communication protocol system can enable relatively "chatty" or "rich" messages (e.g., plurality of messages) to be sent in a "chunky" manner. The exemplary asynchronous communication protocol may even disallow all or certain synchronous calls, thus amortizing latency cost over large numbers of batched messages (i.e. carrying chatty communications in chunky wire transactions). Thus, an exemplary communications model may be substantially 100% asynchronous.

In the example of FIG. 4, the number of communications from the host to the rendering device is reduced by preparing a batch, which has a delay $\Delta t_{Batch}$ Host, instead of separate and distinct individual delays as in the aforementioned synchronous and asynchronous examples. Further, the rendering device may process the communicated batch instructions or metadata as a batch with a delay $\Delta t_{Batch}$ RD. In general, batch processing, whether by the host or the rendering device, is more efficient than processing of tasks serially whereby serial processing is delayed and governed by serial communication of the tasks.

In the example of the timeline 400, the host process the five tasks in a substantially uninterrupted manner, which results in a substantial time saving when compared to serial processing of the five tasks where communication with a rendering device occurs after processing of each individual task. As shown, the host requires a period of time from $t_0$ to $t_f$, which is normally less than the sum of the individual task processing times as shown in the timeline 300 of FIG. 3.

In the example of the timeline 400, the host may encode the five tasks in a network buffer. The process of encoding a batch of information in a network buffer or communication buffer is typically more efficient than the sum of times required to encode a series of individual tasks in a network buffer or communication buffer. Thus, a reduction in time occurs on the host side via the exemplary asynchronous communication protocol.

As the exemplary asynchronous communication protocol reduces the number of communications and the amount of processing time required by the rendering device, there is less chance that video will be interrupted or otherwise compromised by the batch of tasks. Overall, this allows the rendering device to provide the user with a better viewing experience.

Graphical user interfaces are often constructed out of many small parts. In a message oriented model, each message may be an update to one aspect of one part. For a single logical change, an application or applications may require making several changes to various parts of a user interface, preferably at one time (e.g., substantially instantaneously, in an animation sequence, etc.). If these changes are not performed atomically, the user may see unintended partial states. For example, consider the timeline 300 of FIG. 3 and the timeline 400 of FIG. 4. In the timeline 300 of FIG. 3, the messages arrive over the course of multiple frames. In terms of a user's visual experience, for example, unless another technique or method is employed to ensure atomicity on the renderer side, the intervening frames will effectively present on the user interface partially updated states which may not be visually desirable. To avoid such deleterious behavior, for the timeline 300 of FIG. 3 and associated protocol, one could implement renderer side management of atomicity, which, in turn, would increase implementation complexity and cost (e.g., for the rendering device). In contrast, the exemplary timeline 400 of FIG. 4 and associated exemplary protocol, together with various exemplary methods, can place the burden on the host side, which can also allow for use of lighter-weight rendering devices.

An exemplary method may arrange messages (e.g., commands or tasks) into one or more atomic units. Each unit may be a message or a batch of messages. Such an exemplary method can provide for atomicity. For example, a particular set of drawing commands may provide a certain user experience when executed on a rendering device and if not arranged or grouped into an atomic unit, a risk may exist for degrading the quality of the user experience. Thus, an exemplary method may logically group messages based on a desired result for a user. Further, such an exemplary method may account for display of other information or media such as video where a frame rate or a frame-to-frame integrity should be maintained to provide the best user experience.

An exemplary method may arrange messages (e.g., commands or tasks) for graphics or animations together with audio (e.g., beeps, sounds, music, etc.). For example, messages for an animation combined with a "wooshing" sound may be communicated in as a batch of messages. Thus, as described herein, messages related to audio, other control of a rendering device, etc., may be communicated using various exemplary methods, protocols, etc. For example, where a rendering device controls an appliance (e.g., a refrigerator), a graphic, a sound and a temperature control signal may be sent as a batch of messages.

The exemplary asynchronous communication protocol may be referred to as using phases. For example, the timeline 400 includes a host batch processing phase, a communication phase from host to rendering device and a rendering device batch processing phase.

The exemplary asynchronous communications protocol described with reference to the timeline 400 may be used for communications between any suitable sender and receiver. For example, a framework and a renderer may include an exemplary communications protocol layer where the protocol layer is an abstraction that provides services or operations for of transfer information between the framework and the renderer and optionally one or more intermediaries. An exemplary communication protocol optionally allows for extensions, for example, one or more modules that define message segments and that may define associated processing rules.

An exemplary communications protocol uses a message as a basic unit where a communication may be a message or a batch of massages. An exemplary communications protocol may operate according to a messaging model, which may be considered a messaging layer cooperative with a protocol layer. An exemplary protocol layer optionally controls messages in terms of number of messages sent, types of messages sent, batch size, etc.

An exemplary communications protocol specifies a messaging model and a graphics model for use in rendering user interfaces or one or more components thereof on a rendering device where messages originate from or are intermediate to a host device. Such messaging model or graphics model may include objects for performing tasks or representing features related to a user interface. An exemplary host device may include a framework that allows an application to successfully render user interfaces, user interface components, etc., on a rendering device whereby communication between the host device and the rendering device occurs according to an exemplary communication protocol (e.g., the asynchronous communications protocol as described with respect to the timeline 400 of FIG. 4).

Figure 5:
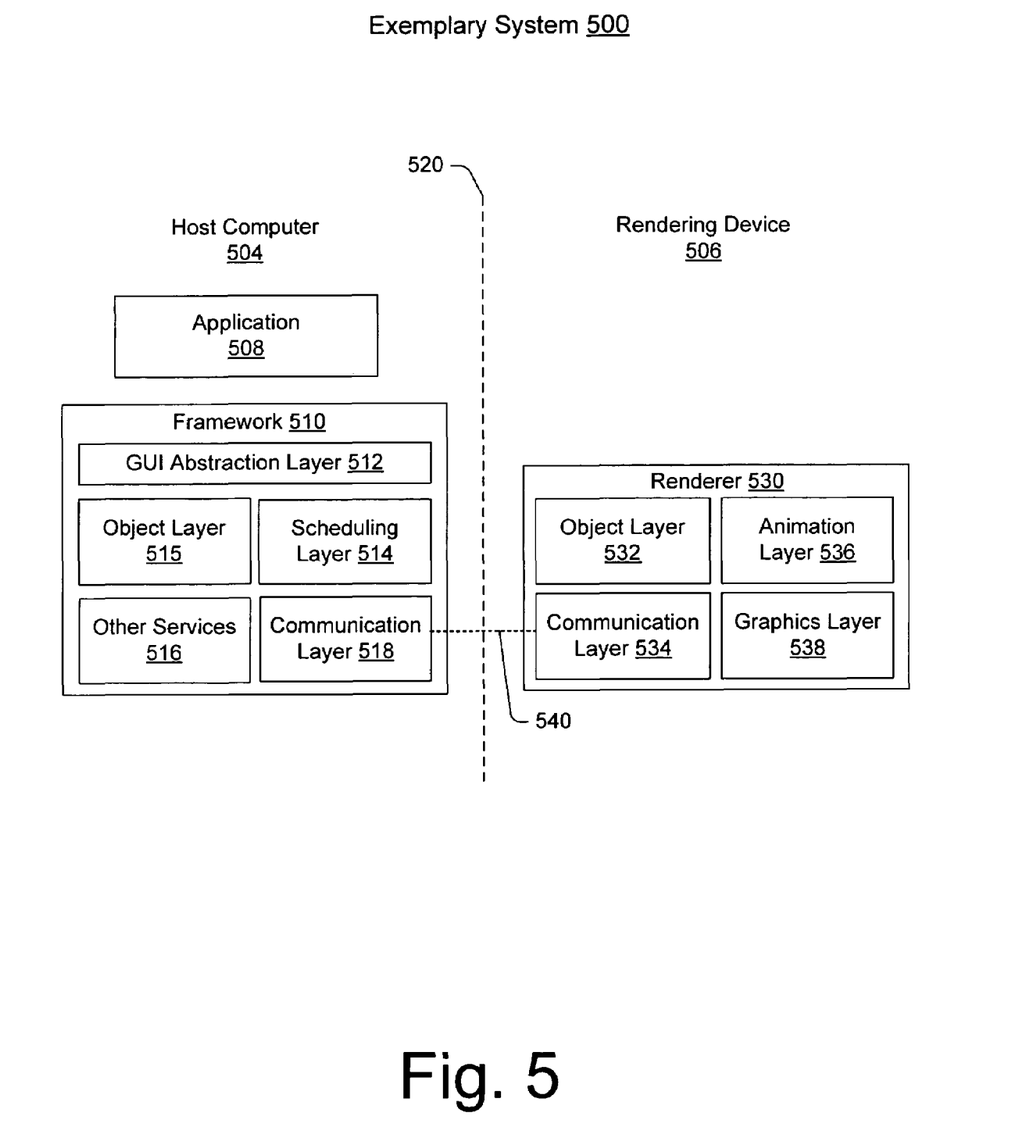
FIG. 5 is a diagram of an exemplary system that includes various components for a host computer and a rendering device wherein communication may occur according to an exemplary protocol.

While the exemplary asynchronous communication protocol described with reference to the timeline 400 may be implemented using equipment such as that shown in FIG. 1, FIG. 5 shows a more detailed exemplary system that may implement the exemplary asynchronous communication protocol of FIG. 4.

The exemplary system 500 includes a host computer 504, a rendering device 506 and a communication link(s) 520 where the dashed line 540 represents communications between the host computer 504 and the rendering device 506. The host computer 504 includes an application 508 and a framework 510 that operates in conjunction with the application 508. The framework 510 includes various framework components such as, but not limited to, a graphical user interface (GUI) abstraction layer 512, a scheduling layer 514, an object layer 515, other services 516 and a communications layer 518. The rendering device 506 includes a renderer 530, which may be software, hardware, a combination of software and hardware, etc. The rendering device 506 may be a remote device, for example, located remote from the host computer 504. As shown in FIG. 5, the renderer 530 includes an object layer 532, a communications layer 534, an animation layer 536, and a graphics layer 538.

The exemplary system 500 may use a high-performance asynchronous messaging model that describes logical rendering and interaction for a remote user interface associated with the rendering device 506. Exemplary protocol elements used in communication between the host computer 504 and the rendering device 506 may include objects to maintain an active connection and facilitate various communication patterns. Exemplary protocol objects may include a broker object as a root object in the protocol; a context object that represents a logical computation site; a render port callback object for callback from a render port in runtime (the render port may be referred to as a message port, typically for renderer related messages); a data buffer callback object for reporting on the status of bulk data transfers; and a data buffer object that represents bulk data on a remote node. The exemplary system 500 may operate according to the exemplary communication protocol described with respect to the timeline 400 of FIG. 4 where the protocol uses one or more of such exemplary objects or other objects.

In the exemplary system 500, the exemplary communication protocol may be used to connect a high-performance messaging model to an instance of the renderer 530 running on the rendering device 506. Typically, the renderer 530 is a software interface for graphics/animation hardware of the rendering device 506. The renderer 530 includes various layers such as an object layer 532 that manages objects. Management of objects may include creation of objects, naming of objects, accessing of objects, etc.

Features provided in a "graphics" language, specification or interface generally form a basis for the animation layer 536 and the graphics layer 538. Consider, for example, the Open Graphics Library (OpenGL), which is a specification defining a cross-language, cross-platform application program interface (API) for writing applications that produce 2D or 3D computer graphics. The OpenGL interface includes about 250 different function calls which can be used to draw various graphics (e.g. from simple primitives to complex three-dimensional scenes constructed from simple primitives). OpenGL is also used in the video games industry as are other specifications, for example, DirectX (e.g., DirectDraw, Direct3D, etc.). HTML or other markup language-based instructions may be used for graphics, etc.

As described herein, an exemplary renderer typically includes an application program interface (API) for defining 2D and 3D graphic images (e.g., for use in a graphics layer 538) that may provide some degree of compatibility across hardware and operating systems and specify a set of messages (e.g., suitable for use as messages). Specific graphics/animation capabilities exposed via such an API may include hidden surface removal, alpha blending, antialiasing, texture mapping, pixel operations, viewing and modeling transformations, atmospheric effects or other capabilities. Such graphic rendering capabilities can typically be used to create high-quality still and animated three-dimensional color images (consider, e.g., the animation layer 536). In general, a rendering device will include a renderer with at least some basic animation capabilities.

As already mentioned, the communication layer 534 of the renderer 530 communicates with the communication layer 518 of the framework 510. The communication layer 534 may allow for communication with devices other than the host computer 504 and may optionally allow for communication with other frameworks. The rendering device 506 may include other layers not shown, such as, but not limited to, a driver layer that describes one or more specific software interfaces for hardware used in rendering and a hardware layer that describes hardware that produces a display.

Referring to the exemplary framework 510 of the host computer 504 shown in FIG. 5, the framework 510 includes the GUI abstraction layer 512 that typically provides a set of APIs for various GUI elements. The GUI abstraction layer 512 may interact with the object layer 515 as objects are created, named, etc., or other layers. The other services 516 may include drawing services, markup language (e.g., XML) parsing services, directional navigation services, data binding services, command interpreter services, animation control system services, UI description template model services, UI layout system services, etc.

In general, the framework 510 allows an application 508 to request presentation of various information or graphics by the rendering device 506, for example, to a user of the rendering device 506. The framework 510 may allow for such requests to more than one rendering device. In general, the exemplary system 500 can provide for high-fidelity remote projection of user interfaces or user interface components by leveraging an exemplary protocol that can batch messages and communicate such batches (e.g., as communications) in an asynchronous manner.

The exemplary system 500 or components thereof may implement various exemplary methods. Of course, other systems or components may be used to implement various exemplary methods (see, e.g., devices of FIGS. 1 and 6). An exemplary method may include communicating one or more messages from an application executing on a host computer to a rendering device wherein the communicating uses an exemplary asynchronous communication protocol. For example, an application may issue messages and a framework may form a batch of the messages and communicate the batch of messages as a communication to a rendering device where, upon receipt of the batch, the rendering device performs rendering according to the messages. An exemplary framework may receive one or more messages from the remote device in response to receipt of the batch of messages (or any message), execution of one or more of the messages, rendering according to one or more of the messages, user interaction with the rendering device in relationship to information in the batch, etc.

A priori knowledge of the rendering capabilities of the rendering device may allow an exemplary framework to cooperate with the application or limit the application to a certain set of messages and to control the number of messages or types of messages in a batch. A priori knowledge of the current state of the rendering device may allow an exemplary framework to schedule messages or batches of messages (e.g., consider the scheduling layer 514), for example, to avoid interrupting or interfering with a user experience of a user of the rendering device. A priori knowledge of the communication link's characteristics (e.g., bandwidth, usage, etc.), may allow an exemplary framework to schedule or otherwise control batches of messages. While various features are mentioned individually for an exemplary framework, a plurality of such features may be optionally combined for scheduling, control, providing a suitable user experience, etc.

As already mentioned, an exemplary protocol may include various objects: a broker object, a context object, a render port callback object (or a message port callback object), a data buffer callback object, a data buffer object, etc. These objects may form part of a messaging model. An exemplary protocol may also include additional definitions layered atop such messaging definitions or objects to form a graphics model. For example, an exemplary protocol may include a graphics model that includes a render builder object to hold a packet of drawing commands (e.g., graphic, animation, etc., commands), a window object that represents a presentation container, a visual object that represents a discrete coordinate space, a device callback object for reporting on the status of a device, a device object that represents a rendering technology driver, a surface object that represents a logical container for image bits, a surface pool object that represents a physical container for image bits, a gradient object for modification of color space of other primitives in a container scope, an animation manager object that serves for animation control, an animation callback object that reports on an animation, and an animation object that describes a logical animation sequence. As discussed herein, a message may be a command, information, etc.

Thus, an exemplary protocol may use a messaging model and a graphics model. The messaging model may act to simplify implementation of a core protocol, allow for extensions, allow for suitable decoupling of host device and rendering device communication timing, etc. The messaging model may include various layers such as a buffer layer (e.g., for basic framing of protocol interactions) and an object messaging model layer (e.g., for lifetime management and communication and where messages are carried in buffers and always refer to an object instance). With respect to buffers, message buffers (e.g., a message or a batch of messages) may be passed to an object layer directly for processing and discarded when processing returns, data buffers may be reserved for various content and registered with an object layer upon arrival, and buffers may be symmetric and bidirectional where the same model for host device to rendering device and vice-versa. The messaging model may include object implementation instances on host device and rendering device. All objects may optionally exist in a per-session table, have a unique handle and be associated with an implementation "class". An instance of an object may be referred to by a handle on the wire and an asymmetric ownership model may be supported. In general, a messaging model may provide that a host device does not need to wait for individual replies (i.e., efficient asynchrony).

In general, asymmetric ownership refers to a master/slave ownership model for device resources. In an exemplary ownership model that may be implemented with various exemplary techniques presented herein, host side management of protocol-visible object may occur. For example, a host side manager may manage the lifetimes of all protocol-visible objects, regardless of which end they live on (e.g., rendering device/renderer end or host device/framework end). Such an exemplary ownership model can provides benefits such as allowing object creation and destruction to be asynchronous (not just messages to the objects), which can provide for higher performance; allowing easy "reconstitution" of a renderer state after connectivity loss or device reset (e.g., without resetting the host); and relieving the renderer implementation of the need for complex allocation and management code for such resources, which, in turn, can reduce cost.

With respect to messages, a messaging model may provide for messages as sized blobs of data that may be associated with a unique message number where numbering is optionally per-class. A messaging model may provide for a non-zero destination object handle where instance messages are sent to object's handle and static messages are sent to class's object handle and provide for a message number. A messaging model may provide for optional payload, for example, packed at the end. The already mentioned broker object may be a root class used for bootstrapping an exemplary protocol that exists with a well-known handle. Such a broker may include only static methods for basic services, for example, class discovery (e.g., creates a class instance for the specified name if available), instance creation (e.g., creates an object instance for the specified class handle, supports passing an optional "constructor" message), and instance destruction (e.g., destroys an object by handle). In general, such messaging model objects are not used directly by an application requesting rendering of a user interface (UI) or UI component on a rendering device.

An exemplary method uses an exemplary protocol for communicating messages or information from an application to a renderer of a rendering device. For purposes of illustrating such an exemplary method, various objects of aforementioned messaging models and graphics models are used in presenting exemplary protocol traffic. In particular, the sample trace that follows (Sample Trace 1) corresponds to a single wire message to create a new RenderBuilder object. The actual message sent is a static CreateObject call to the Broker where the new trace is emitted to exhibit processes such as parameters to the constructor (invoked by the Broker after it creates the instance). Such a trace (Sample Trace 1)

may occur, for example, in the exemplary system 100 between one of the rendering devices 134, 136 of FIG. 1 as driven by an application executing on the host device 132.

| Sample Trace 1 |
|---|
| (new RenderBuilder [class 1000003], constructor Msg1__Create as MessagePtr)<br>    cat = InScene<br>    16 bytes total<br>send Broker [class 1000000] static Msg1__CreateObject<br>    idObjectClass = RH:1000003<br>    idObjectNew = RH:5000146<br>    msgConstruction = [blob MessagePtr] 215548588<br>    +16 bytes blob data<br>    40 bytes total |

In this sample trace, the size of the constructor matches the size of the BLOB data for the msgConstruction parameter to the CreateObject call. In this sequence, the total amount of messaging bytes sent is 40, not 56. While BLOB may refer to a binary large object, size of such data can depend on various factors and can be of the size of the examples or of other sizes; thus, the term BLOB may not always refer to a "large" object. While data is generally binary data as communicated, in various examples, data may optionally be other than binary data.

When a batch of messages is communicated to a renderer (e.g., on a remote rendering device), a callback may be added so the application side messaging code can know when the buffer was actually processed. Thus, the last message in any batch buffer may be a ForwardMessage call instructing the renderer to send the enclosed message back to the application side. In this example, the enclosed message payload is an OnBatchProcessed call back into the messaging runtime itself (see Sample Trace 2).

| Sample Trace 2 |
|---|
| (encode RenderPortCallback Msg0__OnBatchProcessed as MessagePtr)<br>    target = RH:0<br>    uBatchCompleted = 64<br>    20 bytes total<br>send Context [class 1000002] static Msg2__ForwardMessage<br>    idContextDest = ctx:1<br>    msgReturn = [blob MessagePtr] 215548920<br>    +20 bytes blob data<br>    40 bytes total |

As the message runtime assembles and sends the current batch, it may trace information about the batch as a whole and the individual buffer or buffers being used to carry it (e.g., "MESSAGE BATCH 64" and "SENDING BATCH BUFFER: id=RH:0, 912 bytes").

When sending a buffer containing a batch of messages an identification (e.g., an instance id) may allow multiple buffers to be linked together for large batches. A buffer may include bulk binary data (image pixels for a surface, waveform data for a sound, etc). An instance id for a batch or a buffer may allow messages to refer to data of the batch or buffer in subsequent rendering commands. In various examples, a buffer may include messages and data, which may optionally be used by one or more tasks related to a message or a subsequent message.

The Sample "send" Traces 1 and 2 represent actual protocol messages being placed in a buffer. A "Sending Buffer" trace may be available where the trace represents a buffer of protocol data being submitted for transfer to the renderer.

Another sample trace (Sample Trace 3) follows that is trace of messages sent to a renderer by an exemplary framework where a request was made to change focus between two GUI buttons. More specifically, the following batch describes the state and animation changes required to shift focus from one button to another (e.g., focus on a GUI button on a rendering device of FIG. 1), for example, where a button is composed of multiple layers and a continuous pulsating overlay animation. Sample Trace 3 involves a user pressing an arrow key on a remote control, so the first few messages relate to input state (e.g. hide the cursor and ensure proper focus) and the rest of the messages relate to visual rendering state and animations:

| Sample Trace 3 |
|---|
| send FormWindow:100001F Msg16__ForceMouseIdle<br>    fIdle = True<br>    16 bytes total<br>send FormWindow:100001F Msg15__TakeFocus<br>    12 bytes total<br>send Animation:7000062 Msg4__Stop<br>    12 bytes total<br>send Visual:1000177 Msg23__SetVisible<br>    fVisible = False<br>    16 bytes total<br>send Visual:1000177 Msg0__ChangeDataBits<br>    nValue = 0<br>    nMask = 7340039<br>    20 bytes total<br>send Visual:1000177 Msg22__SetContent<br>    rbContent = RenderBuilder:0<br>    16 bytes total<br>send Visual:1000185 Msg23__SetVisible<br>    fVisible = True<br>    16 bytes total<br>send Visual:1000185 Msg0__ChangeDataBits<br>    nValue = 1<br>    nMask = 7340039<br>    20 bytes total<br>send AnimationBuilder [class 100000F] static Msg27__BuildAlphaAnimation<br>    viSubject = Visual:1000185<br>    idAnimation = RH:7000142<br>    20 bytes total<br>send Animation:7000142 Msg1__AddCallback<br>    cb = AnimationCallback:5<br>    20 bytes total<br>send Animation:7000142 Msg10__SetRepeatCount<br>    cRepeats = −1<br>    16 bytes total<br>send Animation:7000142 Msg6__SetStopCommand<br>    cmd = MoveToEnd<br>    16 bytes total<br>send Animation:7000142 Msg2__AddKeyframe<br>    idxKeyframe = 0<br>    flTimeSec = 0<br>    20 bytes total<br>send AnimationBuilder [class 100000F] static Msg3__SetSCurve<br>    ani = Animation:7000142<br>    idxKeyframe = 0<br>    flScale = 1<br>    24 bytes total<br>send AnimationBuilder [class 100000F] static Msg16__SetFloat<br>    ani = Animation:7000142<br>    idxKeyframe = 0<br>    flValue = 0<br>    24 bytes total<br>send Animation:7000142 Msg2__AddKeyframe<br>    idxKeyframe = 1<br>    flTimeSec = 1.5<br>    20 bytes total<br>send AnimationBuilder [class 100000F] static Msg3__SetSCurve<br>    ani = Animation:7000142<br>    idxKeyframe = 1 |

-continued

Sample Trace 3

```
    flScale = 1
    24 bytes total
send AnimationBuilder [class 100000F] static Msg16__SetFloat
    ani = Animation:7000142
    idxKeyframe = 1
    flValue = 0.627451
    24 bytes total
send Animation:7000142 Msg2__AddKeyframe
    idxKeyframe = 2
    flTimeSec = 3
    20 bytes total
send AnimationBuilder [class 100000F] static Msg3__SetSCurve
    ani = Animation:7000142
    idxKeyframe = 2
    flScale = 1
    24 bytes total
send AnimationBuilder [class 100000F] static Msg16__SetFloat
    ani = Animation:7000142
    idxKeyframe = 2
    flValue = 0
    24 bytes total
send Animation:7000142 Msg5__Play
    12 bytes total
(new RenderBuilder [class 1000003], constructor Msg1__Create
    as MessagePtr)
    cat = InScene
    16 bytes total
send Broker [class 1000000] static Msg1__CreateObject
    idObjectClass = RH:1000003
    idObjectNew = RH:5000146
    msgConstruction = [blob MessagePtr] 215548588
    +16 bytes blob data
    40 bytes total
send Surface:30000EE Msg0__DrawGrid
    rb = RenderBuilder:5000146
    flX1Pxl = 20
    flX2Pxl = 231
    flY1Pxl = 12
    flY2Pxl = 41
    rcfDestPxl = {X = 0, Y = 0, Width = −1, Height = −1}
    48 bytes total
send Visual:1000176 Msg22__SetContent
    rbContent = RenderBuilder:5000146
    16 bytes total
send RenderBuilder:5000146 Msg0__Clear
    12 bytes total
send Surface:10000C6 Msg0__DrawGrid
    rb = RenderBuilder:5000146
    flX1Pxl = 20
    flX2Pxl = 231
    flY1Pxl = 12
    flY2Pxl = 41
    rcfDestPxl = {X = 0, Y = 0, Width = −1, Height = −1}
    48 bytes total
send Visual:1000184 Msg22__SetContent
    rbContent = RenderBuilder:5000146
    16 bytes total
send RenderBuilder:5000146 Msg0__Clear
    12 bytes total
send Surface:10000C8 Msg0__DrawGrid
    rb = RenderBuilder:5000146
    flX1Pxl = 20
    flX2Pxl = 231
    flY1Pxl = 12
    flY2Pxl = 41
    rcfDestPxl = {X = 0, Y = 0, Width = −1, Height = −1}
    48 bytes total
send Visual:1000185 Msg22__SetContent
    rbContent = RenderBuilder:5000146
    16 bytes total
(dispose RenderBuilder:5000146)
    send Broker [class 1000000] static Msg0__DestroyObject
    idObject = RH:5000146
    16 bytes total
(encode RenderPortCallback Msg0__OnBatchProcessed as MessagePtr)
    target = RH:0
    uBatchCompleted = 64
```

-continued

Sample Trace 3

```
    20 bytes total
send Context [class 1000002] static Msg2__ForwardMessage
    idContextDest = ctx:1
    msgReturn = [blob MessagePtr] 215548920
    +20 bytes blob data
    40 bytes total
MESSAGE BATCH 64
[SENDING BATCH BUFFER: id = RH:0, 912 bytes]
```

In the Sample Trace 3, messages only drew from surfaces that were previously sent to the renderer. If messages were traced for a transition that required new graphical resources, more traffic would have been devoted to surface allocation, loading pixel data from a bulk data buffer and extreme cases, surface pool compaction.

The batch of Sample Trace 3 stopped the pulsating focus animation on the old focused button. When this occurred, the renderer sent a notification back to the framework that the animation was stopped, triggering some generic handling on the application side that decided it was done with that particular animation object. This in turn created another, small batch of messages instructing the renderer to destroy the old animation, as presented in Sample Trace 4.

Sample Trace 4

```
(dispose Animation:7000062)
send Broker [class 1000000] static Msg0__DestroyObject
    idObject = RH:7000062
    16 bytes total
(encode RenderPortCallback Msg0__OnBatchProcessed as MessagePtr)
    target = RH:0
    uBatchCompleted = 65
    20 bytes total
send Context [class 1000002] static Msg2__ForwardMessage
    idContextDest = ctx:1
    msgReturn = [blob MessagePtr] 215515328
    +20 bytes blob data
    40 bytes total
MESSAGE BATCH 65
[SENDING BATCH BUFFER: id = RH:0, 96 bytes]
```

As described herein an exemplary protocol builds on a messaging model to describe a logical rendering and interaction model for high-fidelity user interface associated with a rendering device, which may be located remotely from a host computer.

An exemplary protocol may include various layers such as functionality-specific modules that implement services, that expose programming interface as objects/messages, and that use a primary set of objects related to a graphics model.

An exemplary graphics model for an exemplary protocol may include a device object, a presentation container object, a surface pool object (e.g., represents coherent storage for bitmap data), a surface object (e.g., individual drawable chunk of a surface pool), a visual object (e.g., logical container for drawing primitives on the screen, own coordinate space, organized as a tree rooted in a presentation container), and a render builder object (e.g., a container for list of drawing primitives being assembled). The exemplary graphics model may include an animation manager (e.g., for coordinates processing of animations) and an individual function instance for animation. Extender graphics objects may be included such as a rasterizer object (e.g., helper object used for preparing surface data) and a gradient object (e.g., a color channel modifier object that can modify other primitives within its scope where traditional 'gradient' functionality is achieved by drawing a solid fill inside). Other objects may include a desktop manager object (e.g., for integration with a desktop), a form object for desktop-oriented presentation container behavior) and a variety of callback interfaces.

As already mentioned, messages may pertain to task other than graphics or animation. Further, a batch of messages may include a mix of tasks such as, but not limited to, graphics tasks, audio tasks, appliance control tasks, etc., as appropriate or desired. For example, a batch of messages may pertain to control of an appliance (e.g., a refrigerator, thermostat, security camera, game unit, etc.), a graphic, a sound or other task.

An exemplary protocol optionally supports extensions. For example, an extension to an exemplary protocol may provide features associating with remoting, i.e., instructing a remote user interface. Such an extension may provide for full-screen or partial screen operations depending on the state of a rendering device. For example, communication of a message or messages may differ for instructing a rendering device's graphical user interface in a full-screen mode and instructing a desktop computer's graphical user interface. If instructions are being communicated to a desktop computer, then extensions may be loaded on the host computer to provide different functionality or communication of messages.

An exemplary protocol optionally allows for communication of messages from a host device to a rendering device that accounts for a user's media experience with respect to the rendering device. For example, where such a user is consuming TV media at a frame rate of approximately 60 fps, then communication may avoid transmission of a batch of messages that would risk interrupting the display of one or more frames. Further, many animations (e.g., fade-in, fade-out, enlarge, etc.) require a certain frame rate to ensure that a user perceives such animations as intended, typically smoothly. Where a communication may risk interrupting a frame or delaying display of a frame, then an exemplary framework (e.g., the framework 510) may account for such risk and communicate in smaller batches or with other adjustments. Of course, in the TV example and the animation example, the host device sending the message or batch of messages may also be providing the animation or the TV media. On such a basis, an exemplary framework may act accordingly to provide a user with a smooth, expected viewing experience. Thus, an exemplary framework may operate to ensure an optimal frame rate with respect to display of information on a rendering device's user interface.

An exemplary framework optionally sends one or more messages in a batch where the timing for communication of the batch to a rendering device ensures that changes to the user interface of the rendering device will not interrupt a frame of an animation or other video display. For example, reception of the batch, execution of the batch messages (e.g., execution of commands, transfer of information, etc.) or display may occur between frames of such an animation or other video display. Consider an application executing on a host device that requests display of a dialog box on a user interface of a rendering device where the user interface is currently displaying video at a frame rate of 60 fps. An exemplary framework on the host device may control messages in a batch manner, timing manner or other manner to ensure that display of the dialog box by the rendering device does not interrupt display of the video.

In general, for some rendering devices, a user may expect a user interface associated with such a rendering device to present uncompromised television video, which has a frame rate of 60 Hz. While users can typically discern glitches about equally at both 24 fps and 60 fps, being late by even $\frac{1}{60}$ s on a single frame of 24 fps video will produce a visible "hiccup" that users may perceive as a loss of quality. Thus, an exemplary protocol may provide for an increase in quality even at frame rates less than 60 fps. As frame rate increases, an exemplary framework typically has less room for error, thereby increasing the need for message control. Again, control on the host side can reduce burdens on the rendering device side, which, in itself, may allow a rendering device to improve display quality.

An exemplary protocol may be used for communicating updates, changes, new user interfaces, new user interface components, presentation of video, etc.

Exemplary Computing Environment

Figure 6:
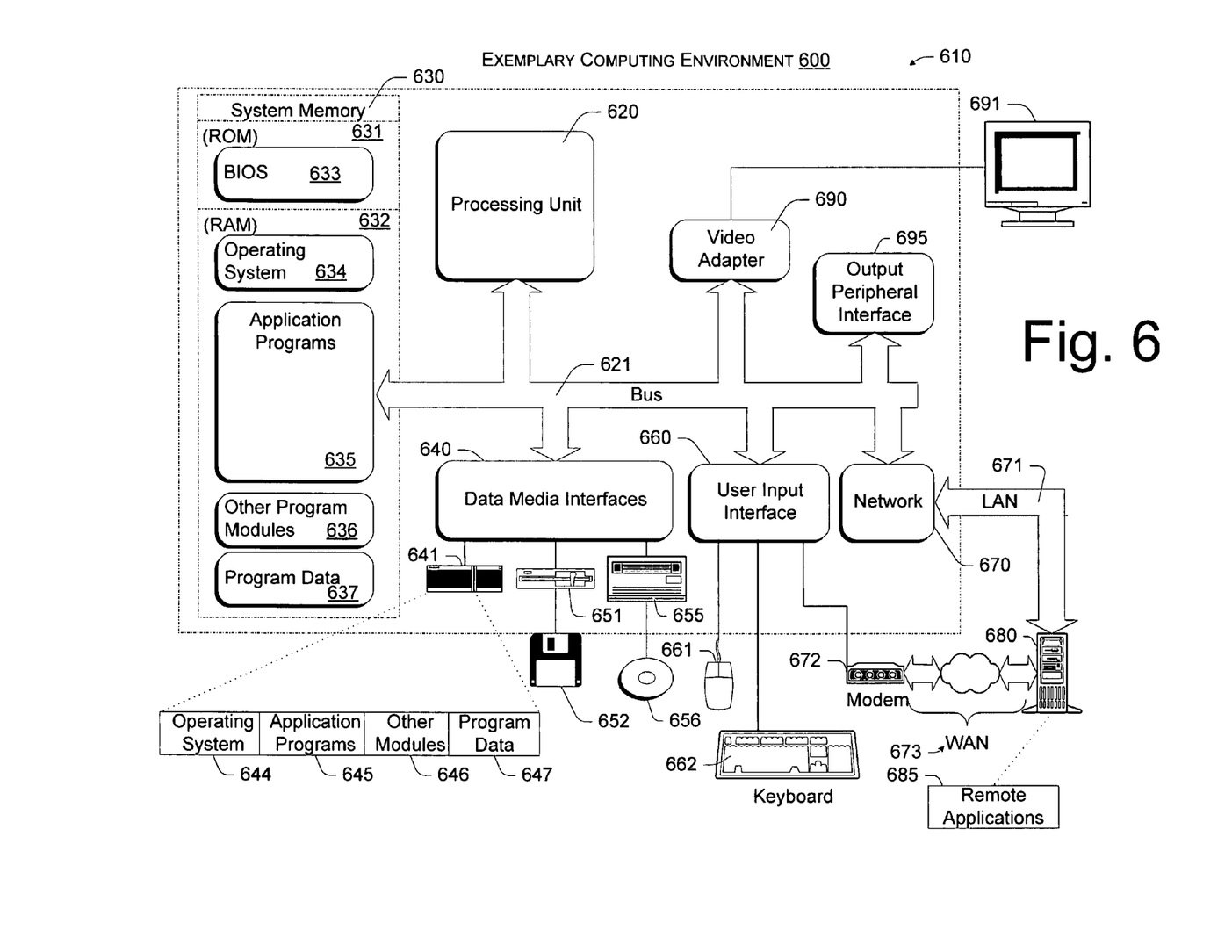
FIG. 6 is a diagram illustrating an exemplary computing environment, which may be used to implement various exemplary technologies described herein.

The various examples may be implemented in different computer environments. The computer environment shown in FIG. 6 is only one example of a computer environment and is not intended to suggest any limitation as to the scope of use or functionality of the computer and network architectures suitable for use. Neither should the computer environment be interpreted as having any dependency or requirement relating to any one or combination of components illustrated in the example computer environment.

FIG. 6 illustrates an example of a suitable computing system environment 600 on which various exemplary methods may be implemented. Various exemplary devices or systems may include any of the features of the exemplary environment 600. The computing system environment 600 is only one example of a suitable computing environment and is not intended to suggest any limitation as to the scope of use or functionality of the invention. Neither should the computing environment 600 be interpreted as having any dependency or requirement relating to any one or combination of components illustrated in the exemplary operating environment 600.

Various exemplary methods are operational with numerous other general purpose or special purpose computing system environments or configurations. Examples of well known computing systems, environments, and/or configurations that may be suitable for implementation or use include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like. For example, the exemplary system 100 of FIG. 1 may use a remote computer to generate information for display of a UI wherein the displayed UI operates in conjunction with a remote control or other input device.

Various exemplary methods, applications, etc., may be described in the general context of computer-executable instructions, such as program modules, being executed by a computer. Generally, program modules include routines, programs, objects, components, data structures, etc., that perform particular tasks or implement particular abstract data types. Various exemplary methods may also be practiced in distributed computing environments where tasks are performed by remote processing devices that are linked through a communications network or other communication (e.g., infrared, etc.). In a distributed computing environment, program modules may be located in both local and remote computer storage media including memory storage devices.

With reference to FIG. 6, an exemplary system for implementing the various exemplary methods includes a general purpose computing device in the form of a computer 610. Components of computer 610 may include, but are not limited to, a processing unit 620, a system memory 630, and a system bus 621 that couples various system components including the system memory 630 to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 610 typically includes a variety of computer readable media. Computer readable media can be any available media that can be accessed by computer 610 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 610. Combinations of the any of the above should also be included within the scope of computer readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, application programs 635, other program modules 636, and program data 637.

The computer 610 may also include other removable/non-removable, volatile/nonvolatile computer storage media. By way of example only, FIG. 6 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media (e.g., DVD, etc.). Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a data media interface such as interface 640, and magnetic disk drive 651 and optical disk drive 655 are typically connected to the system bus 621 a data media interface that is optionally a removable memory interface. For purposes of explanation of the particular example, the magnetic disk drive 651 and the optical disk drive use the data media interface 640.

The drives and their associated computer storage media discussed above and illustrated in FIG. 6, provide storage of computer readable instructions, data structures, program modules and other data for the computer 610. In FIG. 6, for example, hard disk drive 641 is illustrated as storing operating system 644, application programs 645, other program modules 646, and program data 647. Note that these components can either be the same as or different from operating system 634, application programs 635, other program modules 636, and program data 637. Operating system 644, application programs 645, other program modules 646, and program data 647 are given different numbers here to illustrate that, at a minimum, they are different copies. A user may enter commands and information into the computer 610 through input devices such as a keyboard 662 and pointing device 661, commonly referred to as a mouse, trackball or touch pad. Other input devices (not shown) may include a microphone, joystick, game pad, satellite dish, scanner, or the like. These and other input devices are often connected to the processing unit 620 through a user input interface 660 that is coupled to the system bus 621, but may be connected by other interface and bus structures, such as a parallel port, game port or a universal serial bus (USB). A monitor 691 or other type of display device is also connected to the system bus 621 via an interface, such as a video interface 690. In addition to the monitor 691, computers may also include other peripheral output devices such as speakers and printer, which may be connected through a output peripheral interface 695.

The computer 610 may operate in a networked environment using logical connections to one or more remote computers, such as a remote computer 680. The remote computer 680 may be a personal computer, a server, a router, a network PC, a peer device or other common network node, and typically includes many or all of the features described above relative to the computer 610. The logical connections depicted in FIG. 6 include a local area network (LAN) 671 and a wide area network (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 660, or other appropriate mechanism. In a networked environment, program modules depicted relative to the computer 610, or portions thereof, may be stored in a remote memory storage device. By way of example, and not limitation, FIG. 6 illustrates remote application programs 685 as residing on the remote computer 680 (e.g., in memory of the remote computer 680). It will be appreciated that the network connections shown are exemplary and other means of establishing a communications link between the computers may be used.

Although various exemplary methods, devices, systems, etc., have been described in language specific to structural features and/or methodological acts, it is to be understood that the subject matter defined in the appended claims is not necessarily limited to the specific features or acts described. Rather, the specific features and acts are disclosed as exemplary forms of implementing the claimed subject matter.

The invention claimed is:

1. A method of communicating between a host device and a rendering device for controlling a user interface of the rendering device, the method comprising:

generating control messages by a user interface framework executing on the host device, wherein the control messages comprise at least one animation command;

reducing a number of control messages based on a current state of the rendering device to avoid interfering with a user experience with the rendering device;

encoding, by the user interface framework, the control messages in a buffer as blob data; and communicating the blob data as one control message to the rendering device, thereby sending control messages as a batch of control messages, wherein the rendering device displays frames of images at a frame rate and renders according to the control messages of the blob data without disrupting the display of frames at the frame rate.

2. The method of claim 1 wherein the generating comprises receiving one or more commands issued from a remote control to the rendering device and, in response to the one or more commands, generating the control messages by an application executing on the host device.

3. The method of claim 1 wherein communication between the host device and the rendering device occurs asynchronously.

4. The method of claim 1 wherein communication occurs according to a communication protocol that comprises a graphics model for rendering graphics and animations.

5. The method of claim 1 wherein the buffer comprises a network buffer, and wherein the method further comprises:

after communicating the blob data as one control message to the rendering device, obtaining, by the host device, information about a characteristic of the communication between the host device and the rendering device; and changing a number of control messages to include in the blob data in a subsequent communication of blob data to the rendering device.

6. The method of claim 1 further comprising communicating data from the rendering device to the host device by encoding a callback control message as part of the blob data, wherein the callback control message instructs the rendering device to send said data to the host device.

7. The method of claim 1 further comprising encoding additional information in the buffer unrelated to the messages and optionally related to one or more subsequent messages.

8. The method of claim 1 further comprising, after the communicating, generating additional messages, encoding the additional messages in the buffer as blob data, and communicating the blob data to the rendering device prior to receipt of a message by the host device sent from the rendering device.

9. The method of claim 1 wherein the communication occurs according to a communication protocol that comprises at least one member selected from a group consisting of a broker object as a root object in the protocol, a context object that represents a logical computation site, a render port callback object for callback from a render port in runtime, a data buffer callback object for reporting on the status of bulk data transfers, and a data buffer object that represents bulk data on a remote node.

10. The method of claim 1 wherein a last message comprises a call instructing the rendering device to send a message to the host device.

11. The method of claim 1 wherein the messages comprise one or more graphics or animation commands.

12. The method of claim 1 wherein the messages comprise one or more commands associated with a software interface for graphics or animations.

13. The method of claim 1 wherein one or more of the messages rely on at least one member selected from a group consisting of a render builder object to hold a packet of drawing commands, a window object that represents a presentation container, a visual object that represents a discrete coordinate space, a device callback object for reporting on the status of the rendering device, a rendering device object that represents a rendering technology driver, a surface object that represents a logical container for image bits, a surface pool object that represents a physical container for image bits, a gradient object for modification of color space in a container scope, an animation manager object that serves for animation control, an animation callback object that reports on an animation, and an animation object that describes a logical animation sequence.

14. The method of claim 1 comprising a plurality of buffers.

15. A computer storage medium having computer-executable instructions for performing a method on a host device, the method comprising:

in response to the one or more commands, generating messages by an application executing on the host device and reducing a number of messages based on a current state of a rendering device, wherein the application relies on a user interface framework executing on the host device to generate the messages and to encode the messages in a buffer, and further wherein the messages comprise:

one or more messages originating from the application executing on the host computer in communication with a remote device executing a renderer;

one or more animation commands;

one or more graphics commands;

one or more commands associated with a software interface for graphics or animations;

a last message which comprises a call instructing the rendering device to send a copy of the last message back to the host device;

encoding the messages in the buffer as blob data, wherein the buffer comprises a network buffer;

communicating the blob data to the rendering device according to a communication protocol that comprises a graphics model for rendering graphics and animations, wherein the rendering device displays frames of images at a frame rate and renders according to the blob data without disrupting display of frames at the frame rate;

after the communicating, generating additional messages by the application executing on the host device, encoding the additional messages in the buffer as blob data, and communicating the blob data to the rendering device prior to receipt of the last message by the host device sent from the rendering device.

16. The method of claim 15, wherein the encoding of the messages in the network buffer comprises a batch process.

* * * * *